(12) United States Patent
Marx et al.

(10) Patent No.: US 12,370,987 B2
(45) Date of Patent: Jul. 29, 2025

(54) BRAKE-BY-WIRE BRAKING SYSTEM

(71) Applicant: ZF Active Safety GmbH, Koblenz (DE)

(72) Inventors: Andreas Marx, Hartenfels (DE); Fabian Querbach, Lonnig (DE); Roman Bechmann, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 212 days.

(21) Appl. No.: 18/079,051

(22) Filed: Dec. 12, 2022

(65) Prior Publication Data

US 2023/0192049 A1 Jun. 22, 2023

(30) Foreign Application Priority Data

Dec. 20, 2021 (DE) .......................... 102021133892.1

(51) Int. Cl.
*B60T 8/92* (2006.01)
*B60Q 9/00* (2006.01)
(Continued)

(52) U.S. Cl.
CPC .................. *B60T 8/92* (2013.01); *B60Q 9/00* (2013.01); *B60T 7/042* (2013.01); *B60T 8/3255* (2013.01); *B60T 8/885* (2013.01); *B60T 2210/10* (2013.01); *B60T 2210/30* (2013.01); *B60T 2220/03* (2013.01); *B60T 2220/04* (2013.01); *B60T 2220/06* (2013.01); *B60T 2250/04* (2013.01);
(Continued)

(58) Field of Classification Search
CPC ............... B60T 7/042; B60T 7/06; B60T 8/92
See application file for complete search history.

(56) References Cited

U.S. PATENT DOCUMENTS

| 6,626,271 B1* | 9/2003 | Bohm ..................... B60T 13/74 188/158 |
| 2005/0006950 A1* | 1/2005 | Versteyhe ............... B60T 13/68 303/71 |

(Continued)

FOREIGN PATENT DOCUMENTS

| DE | 4017045 A1 | 11/1991 |
| DE | 19735015 A1 | 2/1999 |

(Continued)

*Primary Examiner* — Long T Tran
(74) *Attorney, Agent, or Firm* — Kristin L. Murphy

(57) ABSTRACT

A brake-by-wire braking system for a vehicle having at least two wheels which are able to be braked is described. The braking system comprises at least two brake actuator units, each of which can be associated with one of the wheels of the vehicle which are able to be braked. The braking system further comprises a brake actuation unit for actuation by the driver for braking, having at least one sensor for detecting an activation of the brake actuation unit by the driver, an acceleration actuation unit having at least one sensor for detecting the activation of the acceleration actuation unit by the driver, and at least one electronic control unit which is adapted to operate one or both of the brake actuator units in order to bring about a braking force at an associated wheel. The control unit is adapted to operate the brake actuator units on the basis of an activation of the acceleration activation unit in the event of a fault or failure of the brake actuation unit.

16 Claims, 2 Drawing Sheets

(51) Int. Cl.
*B60T 7/04* (2006.01)
*B60T 8/32* (2006.01)
*B60T 8/88* (2006.01)

(52) U.S. Cl.
CPC ... *B60T 2270/402* (2013.01); *B60T 2270/404* (2013.01); *B60T 2270/413* (2013.01); *B60T 2270/82* (2013.01)

(56) References Cited

U.S. PATENT DOCUMENTS

| | | | | |
|---|---|---|---|---|
| 2007/0198145 | A1* | 8/2007 | Norris | H04L 67/12 |
| | | | | 701/23 |
| 2019/0248354 | A1* | 8/2019 | Andrea | B60T 13/741 |
| 2019/0331221 | A1* | 10/2019 | Shirakawa | B60T 11/10 |
| 2021/0269049 | A1* | 9/2021 | Hallenbeck | B60W 50/0205 |
| 2022/0080942 | A1* | 3/2022 | Eberl | B60L 15/10 |

FOREIGN PATENT DOCUMENTS

| | | | |
|---|---|---|---|
| DE | 10032179 | A1 | 1/2002 |
| DE | 10148281 | A1 | 1/2003 |
| DE | 102013224143 | A1 | 5/2015 |
| DE | 102019103375 | A1 | 8/2020 |
| DE | 102019215422 | A1 | 10/2020 |
| DE | 102020200101 | A1 | 7/2021 |

\* cited by examiner

BRAKE-BY-WIRE BRAKING SYSTEM

CROSS-REFERENCE TO RELATED APPLICATION

This application claims priority to German Priority Application No. 102021133892.1, filed Dec. 20, 2021, the disclosure of which is incorporated herein by reference in its entirety.

TECHNICAL FIELD

The disclosure relates to a brake-by-wire braking system.

BACKGROUND

In brake-by-wire braking systems, a brake actuator unit having an electromechanical brake actuator is associated with each of the individual wheels.

In such systems, only activation of the brake actuation unit is electronically requested by the driver by a brake pedal. On the basis of this activation, the individual brake actuator units are then operated by one or more electronic control devices. There is no mechanical connection between the brake pedal and the brake actuator units.

Because a braking system is a device of a vehicle that is relevant in terms of safety, at least certain components or functions within the braking system are conventionally of redundant design so that the braking system can operate reliably even if a malfunction or a defect occurs. In other words, redundancies are provided within a braking system in order to achieve a high degree of operational reliability.

In the case of previous brake-by-wire systems, an additional hydraulic braking device, for example, known inter alia as a "push-through", is provided as a fallback level.

This is associated with a high outlay and high costs, however. Furthermore, additional installation space is required and the weight of the vehicle is increased.

SUMMARY

Accordingly, what is needed is an optimized brake-by-wire braking system which has a high degree of operational reliability.

A brake-by-wire braking system for a vehicle is disclose, the braking system having at least two wheels which are able to be braked. The brake-by-wire braking system comprises at least two brake actuator units, each of which can be associated with one of the wheels of the vehicle which are able to be braked. The brake-by-wire brake system further comprises a brake actuation unit for actuation by the driver for braking, having at least one sensor for detecting an activation of the brake actuation unit by the driver, an acceleration actuation unit having at least one sensor for detecting the activation of the acceleration actuation unit by the driver, and at least one electronic control unit which is adapted to operate one or both of the brake actuator units in order to bring about a braking force at an associated wheel. The control unit is adapted to operate the brake actuator units on the basis of an activation of the acceleration actuation unit in the event of a fault or failure of the brake actuation unit.

By operation of the braking system according to the disclosure, the operational reliability of the braking system is improved considerably. Even in the event of a complete failure of the brake actuation unit, a driver is still able to initiate a braking operation by operation of the acceleration actuation unit. The acceleration actuation unit is conventionally the gas pedal.

The additional fallback level allows the vehicle to continue to be driven, beyond safe stopping of the vehicle, in the event of a fault.

A fault or failure of the brake actuation unit is present if the activation of the brake actuation unit is no longer reliably detected or further processed.

In order to allow the brake actuator units to be operated on the basis of an activation of the acceleration actuation unit, an acceleration characteristic curve, for example a gas pedal characteristic curve, is so adapted that a residual region towards small deflections is available for a variable deceleration request. This means that at least two different acceleration characteristic curves are stored in the control unit, of which one is foremost in the case of fault-free driving operation and a further one is used in the event of a fault or in the event of a failure of the brake actuation unit.

In one exemplary arrangement, the acceleration actuation unit comprises a gas pedal, and the control unit is so configured that, in the event of a fault or failure of the brake actuation unit, it detects a deflection of the gas pedal, based on an unactuated state of the acceleration actuation unit, below a threshold value as a brake signal. The driver thus has the possibility of requesting deceleration values which can be allotted within limits by releasing the gas pedal.

If the deflection is above the threshold value, the control unit detects an acceleration request, as before. A driving speed can thereby be adapted to the traffic flow so that, even in the event of a complete failure of the brake actuation unit, a journey can safely be continued to a destination.

For example, a defined deceleration can be set if the deflection is below the threshold value.

In one exemplary arrangement, however, the control unit is adapted to derive a desired degree of deceleration in the event of a fault or failure of the brake actuation unit on the basis of a deflection of the gas pedal below the threshold value. A driver can thereby influence a driving behaviour, for example the vehicle speed, in a targeted manner, which likewise contributes to increased driving safety.

According to a further aspect, the control unit is adapted to adjust a degree of deceleration in dependence on at least one driving parameter, wherein the at least one driving parameter is a driving speed, road conditions, a steering angle and/or an overall driving situation. This likewise contributes to increased driving safety in the event that the driving behaviour is adversely affected by the deceleration, or it is avoided that the driving behaviour is adversely affected by the deceleration.

The degree of deceleration in the event of a fault or failure of the brake actuation unit can be limited to a maximum value. Excessively abrupt braking of the vehicle is thereby avoided.

The brake actuation unit comprises, for example, a brake pedal having at least two sensors for detecting the activation of the brake actuation unit by the driver, for example, wherein there is at least one sensor for detecting a deflection of the brake pedal and at least one force sensor for detecting a braking force. By providing two sensors, an activation can be detected redundantly. Because there is at least one sensor for detecting a deflection of the brake pedal, for example a position sensor or an angle sensor, and at least one force sensor for detecting a braking force, that is to say there are two different types of sensor, the detection accuracy is increased.

The brake actuation unit can have a plurality of signal processing units, and one signal processing unit can be associated with the at least one sensor for detecting the deflection of the brake pedal and another signal processing unit can be associated with the at least one force sensor, wherein the signal processing units are electrically coupled with the control unit. By providing at least two signal processing units, an activation of the brake actuation unit by the driver can be detected redundantly. As a result of the coupling with the control unit, the detected signals can be transmitted to the control unit and processed further.

In one exemplary arrangement, the control unit is configured to operate the brake actuator unit on the basis of the activation of the acceleration actuation unit when a plurality of sensors or a plurality of signal processing units have failed. This means that, as soon as a signal can no longer be transmitted from the brake actuation unit to the control unit or activation of the brake actuation unit cannot be detected at all, a braking request can be established on the basis of an activation of the acceleration actuation unit. The additional fallback level already mentioned hereinbefore is thereby implemented.

For example, the control unit comprises a separate controller for each signal processing unit of the brake actuation unit, and this controller further processes a signal transmitted by the associated signal processing unit. An additional redundancy is thereby implemented.

In one exemplary arrangement, the control unit is adapted to transmit a signal to the driver when the brake actuator units are being operated on the basis of an activation of the acceleration actuation unit. The signal can be a driver alert or a service request. A driver can consequently adapt his manner of driving accordingly in the event of a failure of the brake actuation unit. The information transmitted to a driver is in particular the information that activation of the brake actuation unit is ineffective and deceleration of the vehicle is achieved by releasing the gas pedal.

According to one aspect, at least one driving parameter can be restricted as long as the brake actuator units are being operated on the basis of an activation of the acceleration actuation unit, in particular wherein the restricted driving parameter is a vehicle speed and/or a permitted remaining driving distance. This likewise contributes to increased driving safety. Initiating a braking operation by activating the acceleration actuation unit requires increased attentiveness on the part of the driver because it is not usual practice, and for this reason it is advantageous to limit the driving speed. By limiting the permitted remaining driving distance, it is ensured that the braking system is repaired promptly after the brake actuation unit has failed.

BRIEF DESCRIPTION OF DRAWINGS

Further advantages and features of the disclosure will become apparent from the following description and from the accompanying drawings, to which reference is made. In the drawings.

DETAILED DESCRIPTION

Figure 1:
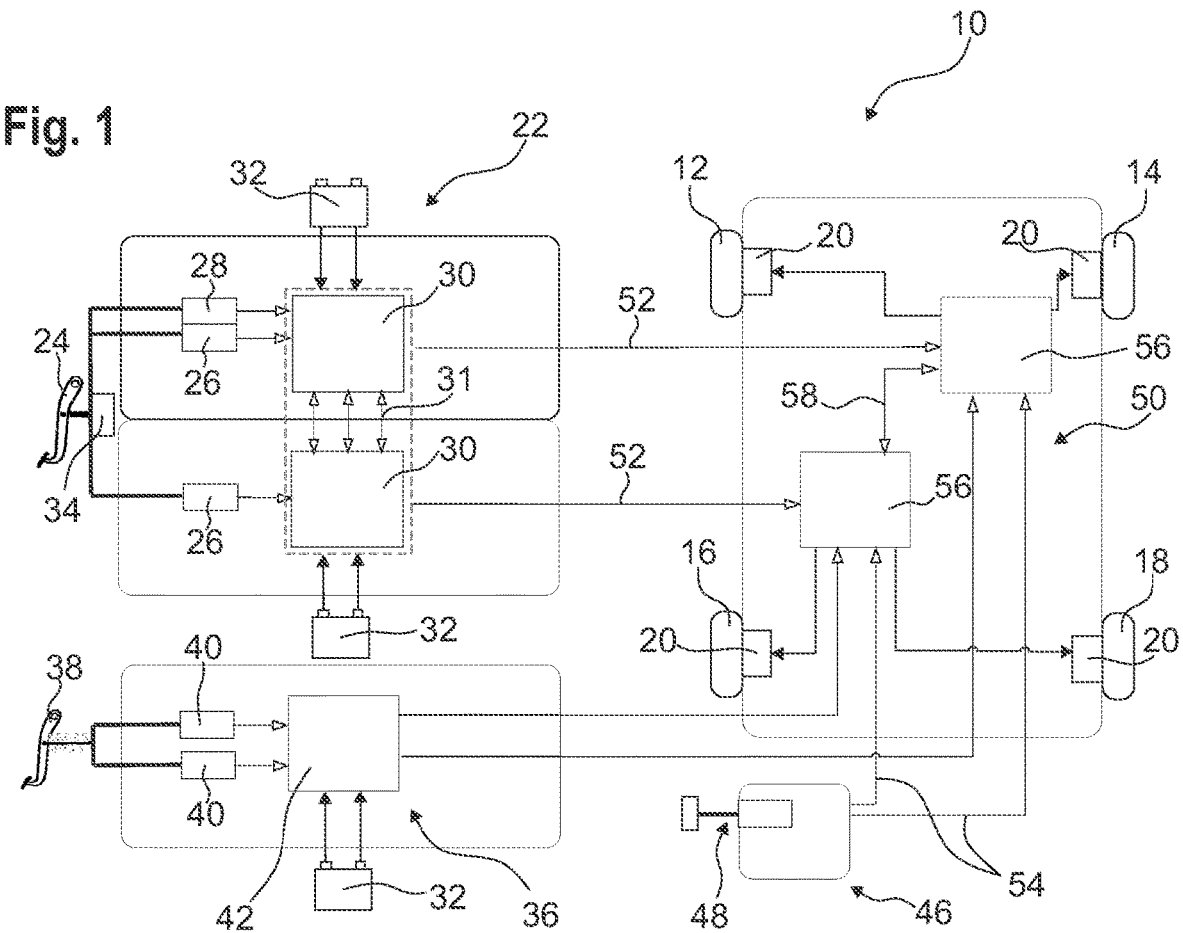
FIG. 1 shows, schematically, a braking system according to the disclosure.

FIG. 1 shows, schematically, a brake-by-wire braking system 10 for a vehicle having four wheels 12, 14, 16, 18 which are able to be braked. In the exemplary arrangement, the vehicle has two front wheels and two rear wheels.

A brake actuator unit 20 is associated with each of the wheels 12, 14, 16 18.

The brake actuator units 20 each comprise, for example, an electromechanical actuator having an electric motor and a spindle drive, which is not shown in the figure for the sake of simplicity. A hydraulic actuator is not provided.

By operation of the brake actuator units 20, a brake shoe associated with each wheel 12, 14, 16, 18 can be moved and pressed against a brake disc in order to brake the vehicle.

The braking system 10 further comprises a brake actuation unit 22 for actuation by the driver for braking.

The brake actuation unit 22 has a brake pedal 24 which can be actuated by a driver with his foot.

The brake actuation unit 22 in the exemplary arrangement further comprises two sensors 26 for detecting a deflection of the brake pedal 24, and a force sensor 28 for detecting a braking force in the case of activation of the brake actuation unit 22 by the driver. In other words, the sensors 26, 28 serve to detect the braking intention of the driver, which he signals by actuation of the brake pedal 24.

The brake actuation unit 22 additionally has two signal processing units 30. A signal processing unit 30 is associated with each sensor 26 for detecting the deflection of the brake pedal 24. One of the two signal processing units 30 is additionally associated with the force sensor 28. If additional sensors 26, 28 are present, these can likewise be associated with one of the two signal processing units 30. Alternatively, further signal processing units 30 can be present.

The signal processing units 30 can detect, process and forward a signal measured by the sensors 26, 28.

Each signal processing unit 30 has an associated energy supply unit 32, which supply the signal processing units 30 with energy.

The signal processing units 30 of the brake actuation unit 22 can communicate with one another via signal lines 31.

In one exemplary arrangement, the signal processing units 30 can exchange information for the purpose of synchronization or information about a braking force or other information.

The brake actuation unit 22 additionally has a braking force simulator 34 which generates a counter-pressure which acts against the pressure exerted on the brake pedal 24 by the driver.

The braking system 10 additionally comprises an acceleration actuation unit 36 having a gas pedal 38 and at least one sensor 40 for detecting the activation of the acceleration actuation unit 36 by the driver. In the exemplary arrangement, the acceleration actuation unit 36 comprises two sensors 40 for detecting a deflection of the gas pedal 38. The sensors 40 are, for example, position sensors and/or angle sensors. Alternatively or additionally, at least one force sensor for detecting an actuating force can be provided.

The acceleration actuation unit 36 likewise comprises a signal processing unit 42. This signal processing unit is associated with the sensors 40.

The signal processing unit 42 also has an associated energy supply unit 44, which supplies the signal processing unit 42 with energy.

The braking system 10 further comprises a parking brake 46 having a parking brake actuation unit 48 which can be actuated by a driver for the purpose of triggering the parking brake 46.

The braking system 10 also has an electronic control unit 50 which is adapted to operate the brake actuator units 20 in order to bring about a braking force at an associated wheel 12, 14, 16, 18.

The signal processing units 30, 42 are connected for signalling with the control unit 50, via signal lines 52.

The parking brake 46 is likewise connected for signalling with the control unit 50 via signal lines 54.

The control unit comprises a separate controller 56 for each signal processing unit 30 of the brake actuation unit 22.

The controllers 56 are in this case adapted to further process a signal transmitted by the associated signal processing unit 30.

For example, the controllers 56 can each operate one or more brake actuator units 20 in order to bring about a braking force at an associated wheel 12, 14, 16, 18.

In the exemplary arrangement, one controller 56 operates two brake actuator units 20.

Alternatively, it is also conceivable that each controller 56 is connected for signalling with all the brake actuator units 20 in order to operate them. In the event of a failure of one controller 56, the further controller 56 can thus operate all the brake actuator units 20.

Further alternatively, the control unit 50 can comprise for each brake actuator unit 20 a separate controller 56 which operates the brake actuator directly.

The controllers 56 are likewise connected by a signal line 58, for example, via a bus line.

According to the disclosure, the control unit 50 is adapted to operate the brake actuator units 20 on the basis of an activation of the acceleration actuation unit 36 in the event of a fault or failure of the brake actuation unit 22.

A fault or failure of the brake actuation unit 22 is present if the sensors 26, 28, the signal processing units 30 and/or the signal lines 52 fail.

More specifically, the control unit 50 is so configured that, in the event of a fault or failure of the brake actuation unit 22, it detects a deflection of the gas pedal 38, based on an unactuated state of the acceleration actuation unit 36, below a defined threshold as a brake signal.

Figure 2:
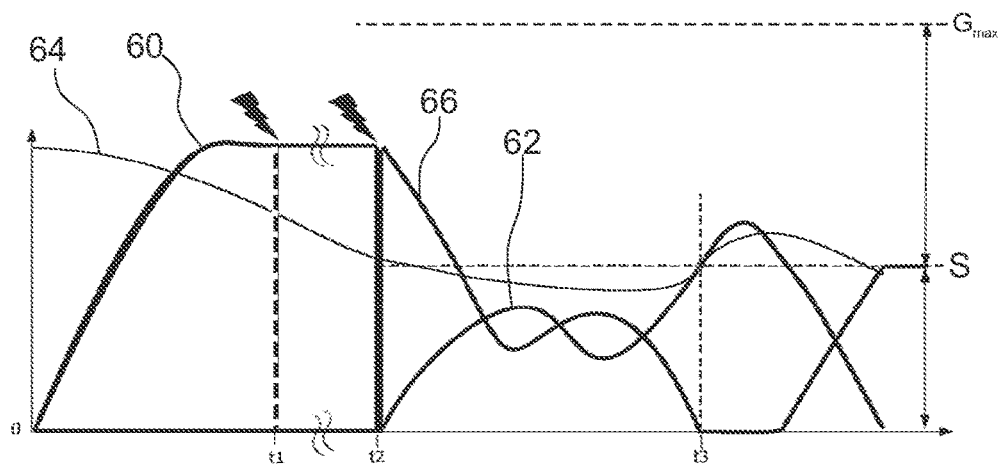
FIG. 2 shows, via a graph, a braking operation according to a first scenario, in which a brake actuation unit fails during a braking operation.

A braking operation using a brake-by-wire braking system 10 according to the disclosure according to a first scenario is illustrated in FIG. 2.

FIG. 2 shows a diagram in which a pedal travel in mm detected for the operation of the brake actuator units 20 is plotted over the time in seconds, both for the brake pedal 24 and for the gas pedal 38.

The detected pedal travel of the brake pedal 24 is illustrated by curve 60. The detected pedal travel of the gas pedal 38 is illustrated by curve 62.

Furthermore, a vehicle speed is illustrated by curve 64 and a deceleration request due to activation of the acceleration actuation unit 36 is illustrated by curve 66.

In the case of the scenario illustrated in FIG. 2, the brake actuation unit 22 is initially activated, for example by actuation of the brake pedal 24, which is apparent from the increasing pedal travel detected by the sensors 26, 28.

The vehicle speed consequently falls.

At time $t_1$, one of the sensors 26, 28 fails. However, because there is a plurality of sensors 26, 28, the braking operation can be continued normally.

In this condition, the control unit 50 can transmit a signal to the driver so as to inform him of the failure.

At time $t_2$, there is a complete failure of the brake actuation unit 22, that is to say activation of the brake actuation unit 22, or a pedal travel of the brake pedal 24, cannot be detected or transmitted to the control unit 50.

From time $t_2$, the brake actuator units 20 can be operated on the basis of an activation of the acceleration actuation unit 36.

This means that, when a driver starts to depress the gas pedal 38 from time $t_2$, the control unit interprets this as a deceleration request and not as an acceleration request.

In order that it continues to be possible to accelerate and not merely brake the vehicle, the control unit 50 is so configured that, in the event of a fault or failure of the brake actuation unit 22, it detects a deflection of the gas pedal 38, based on an unactuated state of the acceleration actuation unit 36, below a threshold value S, which is illustrated in FIG. 2 by a broken line, as a brake signal.

The control unit 50 is additionally adapted to derive a desired degree of deceleration in the event of a fault or failure of the brake actuation unit 22 on the basis of a deflection of the gas pedal 38 below the threshold value S.

The magnitude of the deceleration is thereby opposite to the deflection of the gas pedal 38, that is to say, the less the gas pedal 38 is depressed by the driver, the greater the deceleration of the vehicle.

If the threshold value S is exceeded and the gas pedal 38 is depressed beyond the threshold value S, as occurs at time $t_3$, this is interpreted by the control unit 50 as a pure acceleration request. The vehicle speed consequently increases again from time $t_3$.

An actuation range of the gas pedal 38 is thus divided into a deceleration range and an acceleration range.

In FIG. 2, a maximum travel $G_{Max}$ of the gas pedal 38 is illustrated by means of a broken line.

It is also apparent from FIG. 2 that the speed of the vehicle decreases more slowly in the time period $t_2$ to $t_3$ than in the time period $t_1$ to $t_2$.

This is because the degree of deceleration in the event of a fault or failure of the brake actuation unit 22 is limited to a maximum value. This avoids abrupt braking of the vehicle, for which the driver is not prepared, directly after the failure of the brake actuation unit 22, if the driver does not activate the acceleration actuation unit 36.

The control unit 50 can additionally be adapted to adjust a degree of deceleration in dependence on at least one driving parameter, wherein the at least one driving parameter is a driving speed, road conditions, a steering angle and/or an overall driving situation. It is thus possible to adapt a degree of acceleration to a driving situation in the event of failure of the brake actuation unit 22.

The control unit 50 is additionally adapted to transmit a signal to the driver when the brake actuator units 20 are being operated on the basis of an activation of the acceleration actuation unit 36. A driver is thus informed that actuation of the brake pedal 24 from that time onwards is ineffective.

In addition, various driving parameters can be restricted as long as the brake actuator units 20 are being operated on the basis of an activation of the acceleration actuation unit 36, for example wherein the restricted driving parameter is a driving speed and/or a permitted remaining driving distance.

Figure 3:
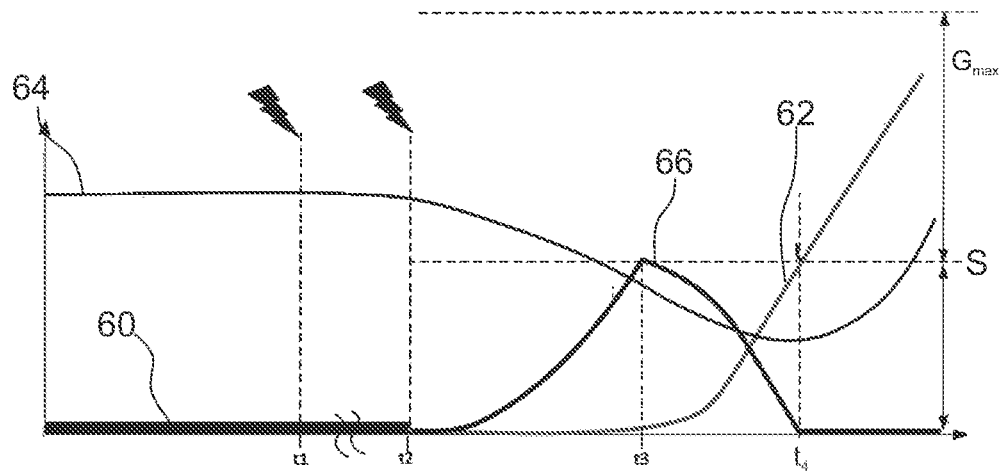
FIG. 3 shows, via a graph, a braking operation according to a further scenario, in which a brake actuation unit has already failed before the start of a braking operation.

FIG. 3 illustrates a braking operation according to a further scenario.

In the scenario according to FIG. 3, the brake actuation unit 22 fails before a braking operation is initiated by the driver.

Consequently, curve 60 extends at zero because, owing to the failure of the brake actuation unit 22, no pedal travel of the brake pedal 24 is detected.

If the deflection of the gas pedal 38 at the time of the failure is below the threshold value S, a braking operation is automatically started at time $t_2$, even if this was not intended by the driver.

However, the driver is able to recognize that the brake actuation unit 22 has failed by a signal transmitted by the control unit 50.

In order to maintain the vehicle speed or in order to accelerate again, the driver must depress the gas pedal 38 beyond the threshold value S. As soon as the threshold value S is exceeded at time $t_4$, acceleration of the vehicle takes place.

Figure 4:
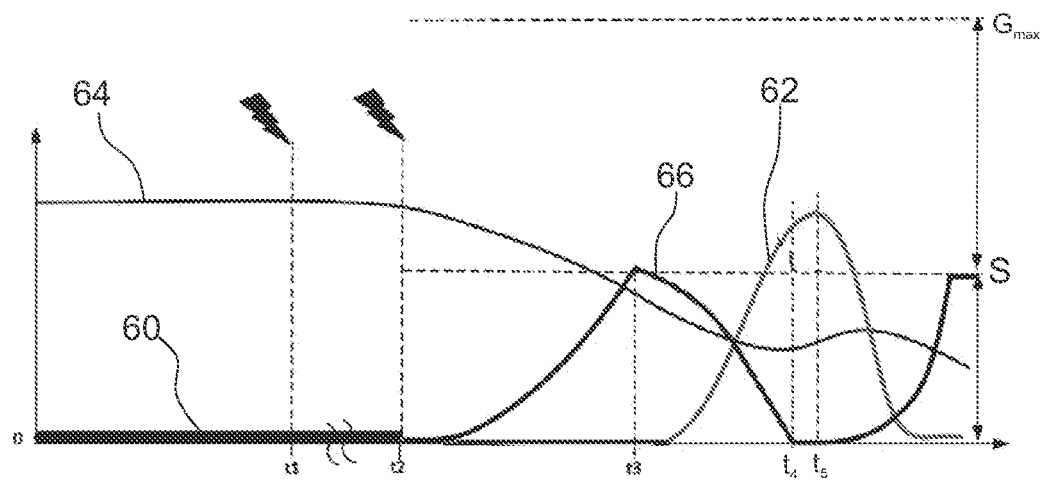
FIG. 4 shows, via a graph, a braking operation according to a third scenario, in which, when the brake actuation unit has failed, braking and acceleration are repeatedly carried out.

FIG. 4 illustrates a further driving scenario, which continues the scenario of FIG. 3.

In one exemplary arrangement, a driver initially accelerates after a failure of the brake actuation unit 22, as has already been described in connection with FIG. 3.

From time $t_5$, the driver wishes to reduce the vehicle speed again.

By releasing the gas pedal 38 above the threshold value S, the vehicle is already decelerated slightly as a result of the lower acceleration.

As soon as the gas pedal 38 is released into the region below the threshold value S, the vehicle is actively decelerated by operation of the brake actuator unit 20.

For example, the deceleration increases to the maximum value.

The invention claimed is:

1. A brake-by-wire braking system for a vehicle having at least two wheels which are able to be braked, comprising:
    at least two brake actuator units, each of which can be associated with one of the wheels of the vehicle which are able to be braked,
    a brake actuation unit for actuation by a driver for braking, having at least one brake sensor for detecting an activation of the brake actuation unit by the driver,
    an acceleration actuation unit having at least one acceleration sensor for detecting the activation of the acceleration actuation unit by the driver,
    at least one electronic control unit which is adapted to operate one or both of the brake actuator units in order to bring about a brake force at an associated wheel,
    wherein the control unit is adapted to operate the brake actuator units on the basis of an activation of the acceleration actuation unit in the event of a fault or failure of the brake actuation unit, and
    wherein the control unit is configured to detect a deflection of the acceleration actuation unit below a threshold value as a brake signal and a deflection of the acceleration actuation unit above the threshold value as an acceleration signal, allowing both braking and acceleration control through the acceleration actuation unit after failure of the brake actuation unit.

2. The braking system according to claim 1, wherein the control unit is adapted to derive a desired degree of deceleration in the event of a fault or failure of the brake actuation unit on the basis of a deflection of the gas pedal below the threshold value.

3. The braking system according to claim 1, wherein the control unit is adapted to adjust a degree of deceleration in dependence on at least one driving parameter, wherein the at least one driving parameter is a driving speed, road conditions, a steering angle and/or an overall driving situation.

4. The braking system according claim 1, wherein the degree of deceleration in an event of a fault or failure of the brake actuation unit is limited to a maximum value.

5. The braking system according to claim 1, wherein the brake actuation unit comprises a brake pedal having at least two brake sensors for detecting the activation of the brake actuation unit by the driver, wherein there is at least one brake sensor for detecting the deflection of the brake pedal and at least one force sensor for detecting a braking force.

6. The braking system according to claim 5, wherein the brake actuation unit has a plurality of signal processing units, and one signal processing unit is associated with the at least one brake sensor for detecting the deflection of the brake pedal and another signal processing unit is associated with the at least one force sensor, wherein the signal processing units are electrically coupled with the control unit.

7. The braking system according to claim 6, wherein the control unit is configured to operate the brake actuator unit on a basis of the activation of the acceleration actuation unit when the plurality of sensors or a plurality of signal processing units have failed.

8. The braking system according to claim 7, wherein the control unit comprises a separate controller for each signal processing unit of the brake actuation unit, and this controller further processes a signal transmitted by the associated signal processing unit.

9. The braking system according to claim 8, wherein the control unit comprises a separate controller for each brake actuator unit, and this controller operates the brake actuator directly.

10. The braking system according to claim 8, wherein the control unit is adapted to transmit a signal to the driver when the brake actuator units are being operated on the basis of an activation of the acceleration actuation unit.

11. The braking system according to claim 8, wherein at least one driving parameter is restricted as long as the brake actuator units are being operated on the basis of an activation of the acceleration actuation unit.

12. The braking system according to claim 6, wherein the control unit comprises a separate controller for each signal processing unit of the brake actuation unit, and this controller further processes a signal transmitted by the associated signal processing unit.

13. The braking system according to claim 1, wherein the control unit comprises a separate controller for each brake actuator unit, and this controller operates the brake actuator directly.

14. The braking system according to claim 1, wherein, the control unit is adapted to transmit a signal to the driver when the brake actuator units are being operated on the basis of an activation of the acceleration actuation unit.

15. The braking system according to claim 1, wherein at least one driving parameter is restricted as long as the brake actuator units are being operated on the basis of an activation of the acceleration actuation unit.

16. The braking system according to claim 15, wherein the restricted driving parameter is a driving speed and/or a permitted remaining driving distance.

* * * * *